United States Patent [19]
Oike et al.

[11] Patent Number: 5,414,595
[45] Date of Patent: May 9, 1995

[54] DISPLAY APPARATUS FOR VEHICLE

[75] Inventors: Toshio Oike; Hiroyuki Yokota, both of Shizuoka, Japan

[73] Assignee: Yazaki Corporation, Tokyo, Japan

[21] Appl. No.: 149,914

[22] Filed: Nov. 10, 1993

[30] Foreign Application Priority Data

Nov. 19, 1992 [JP] Japan .................. 4-080027 U
Nov. 19, 1992 [JP] Japan .................. 4-080028 U
Aug. 2, 1993 [JP] Japan .................. 5-042329 U

[51] Int. Cl.6 ............................................ G01D 13/28
[52] U.S. Cl. ........................................ 362/26; 362/30; 362/32; 116/48
[58] Field of Search ................ 362/23, 26, 29, 30, 362/32; 73/499; 116/48, 62.1

[56] References Cited

U.S. PATENT DOCUMENTS

| | | | |
|---|---|---|---|
| 4,218,726 | 8/1980 | Fukasawa et al. | 362/23 |
| 4,959,759 | 9/1990 | Kohler | 362/99 |
| 5,142,456 | 8/1992 | Murphy | 362/23 |

FOREIGN PATENT DOCUMENTS 0497316  8/1992  European Pat. Off. .
4310605  10/1993  Germany .

*Primary Examiner*—Ira S. Lazarus
*Assistant Examiner*—Sara Sachie Raab
*Attorney, Agent, or Firm*—Armstrong, Westerman, Hattori, McLeland & Naughton

[57] ABSTRACT

A display apparatus for a vehicle with a light introducing member in which light emitted by a light source passes through a slit. The slit is used as a luminous pointer with high luminance, resulting in improved recognizability and readability of the display apparatus. The display apparatus for a vehicle according to the present invention comprising: a dial; a pointer plate with a substantially round light-transmissible portion, the pointer plate situated on a front side of the dial and driven to rotate according to a measured value; a light-transmissible slit formed on the pointer plate; a light source situated on a rear side of the dial; and a light introducing member for gathering light from the light source to introduce the light into the slit.

7 Claims, 9 Drawing Sheets

F I G. 1 1
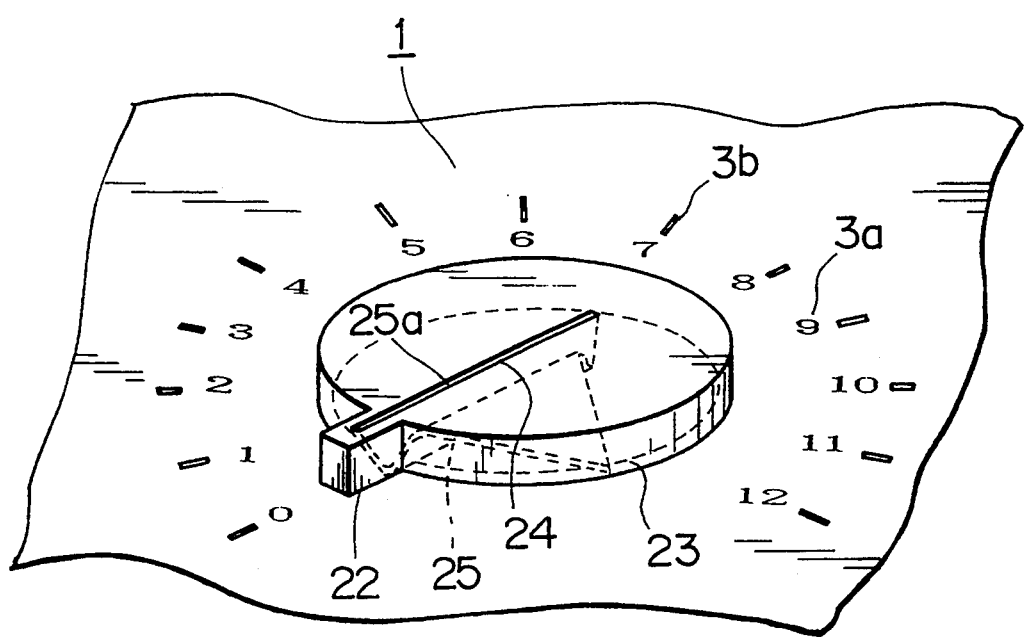
F I G. 1 2
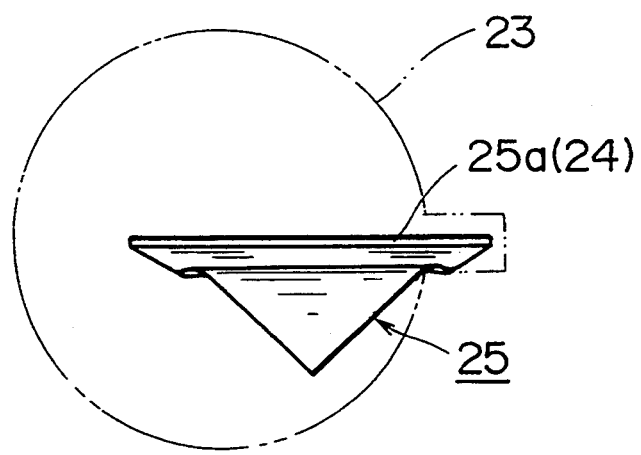

5,414,595

DISPLAY APPARATUS FOR VEHICLE

BACKGROUND OF THE INVENTION

1. Field of the Invention

The present invention relates to a display apparatus for a vehicle in which light emitted by a light source passes through a slit so as to be used as a luminous pointer.

2. Description of the Prior Art

A self-light-emitting type display apparatus with a disk-shaped pointer having a linear light-transmissible portion, which is rotated by an instrument unit, has been used to display information on driving conditions such as vehicle speed for a driver. In this conventional display apparatus, a linear light passes through the light-transmissible portion is used as a luminous pointer.

FIGS. 16 to 19 show the conventional display apparatus for a vehicle with the above construction. A substantially circular light-diffusing portion 2 is formed on a dial 1 made of a light-diffusing plate, which is disposed in an instrument case mounted on a dashboard of a vehicle. Light-transmissible characters 3a and graduations 3b are situated on an outer periphery of the light-diffusing portion 2. A light-intercepting layer 4 with black color or the like is formed on a surface of a portion excluding the light-diffusing portion 2, the characters 3a and the graduations 3b. A center hole 5 is formed in the middle of the light-diffusing portion 2 through which a rotating shaft of an instrument movement 6 with cross-coil type or the like passes.

A disk-shaped pointer plate 8 is positioned on the front side of the dial 1. The pointer plate 8 is made of transparent material such as an acrylics or polycarbonate, and has a slightly large diameter than that of the light-diffusing portion 2. A rotating shaft 7 is connected and fixed to the pointer plate 8. Further, a light-transmissible slit 9 as a pointer radially extends from the center of the pointer plate 8 to an end thereof. The light-intercepting layer 4 is formed on a surface of a portion of the pointer plate 8 except for an area of the slit 9. A ring-shaped cathode ray tube 10 as a light source is situated on the rear side of the pointer plate 1 in such a manner as to enclose the instrument movement 6.

In the conventional display apparatus described above, on switching on the cathode ray tube 10, the light emitted by the light source 10 is irradiated on a rear face of the dial 1 and passes the light-diffusing portion 2 to reach the rear face of the pointer plate 8. Then, the light from the light source passes through portions corresponding to the characters 3a, the graduations 3b and the slit 9, so that those portions become luminous. The instrument movement 6 is driven according to a measured value under the condition described above to rotate the pointer plate 8. As a result, the slit 9 as a luminous pointer portion indicates the light-emitting characters 3a and graduations 3b to perform analog display of the information on driving conditions such as vehicle speed.

As illustrated in FIG. 19, the pointer plate 8 is formed slightly larger than the light-transmissible portion 2 so that a peripheral portion 8a of the pointer plate 8 overlaps with a peripheral portion 2a of the light-transmissible portion 2, which prevents the light-transmissible portion 2 from being recognized from a portion a between the dial 1 and the pointer plate 8 when the driver moves his or her eyes from the front of the instrument.

However, a portion b where the dial 1 overlaps with the pointer plate prevents a tip 9a of the slit from sufficiently emitting light by the backlighting to reduce the luminance of the tip 9a of the slit 9, resulting in poor appearance of the apparatus. Therefore, the light-intercepting layer 4 is formed on a surface of the tip also.

However, with the conventional display apparatus described above, a part of the light irradiating the rear face of the pointer plate 8 which reaches a portion corresponding to the slit 9 passes through the slit 9 of the pointer plate 8 so that the quantity of the light is insufficient to cause the luminous pointer portion to be luminous with sufficiently high luminance, which reduces the recognizability and readability of the pointer.

Further, since the light-intercepting layer 4 is formed on the tip 9a of the slit 9 as described above, the length of the slit 9 should be shortened to form the luminous pointer portion. As a result, the tip 9a and the luminous characters 3a become apart from each other as illustrated in FIG. 17, which reduces the recognizability and readability of the pointer.

Further, the length of the slit 9 as the luminous pointer is shortened so that the display apparatus as a whole is looked small under hallucination, which reduces the product value of the apparatus.

SUMMARY OF THE INVENTION

The present invention has been accomplished to eliminate the above drawbacks of the conventional display apparatus described above and the object thereof is to provide a display apparatus for a vehicle in which a luminous pointer portion becomes luminous with high luminance by backlighting to improve recognizability and readability of the pointer. A display apparatus for a vehicle according to an embodiment of the present invention comprising: a dial; a pointer plate with a substantially round light-transmissible portion, the pointer plate situated on a front side of the dial and driven to rotate according to a measured value; a light-transmissible slit formed on the pointer plate; a light source situated on a rear side of the dial; and a light introducing member for gathering light from the light source to introduce the light into the slit.

In a display apparatus for a vehicle according to another embodiment of the present invention, the light introducing member is a light introducing plate for receiving the light from the light source on a front face thereof and emitting the light from a side face thereof, and the side face where the light is emitted is situated in close vicinity to the slit of the pointer plate.

BRIEF DESCRIPTION OF THE DRAWINGS

The present invention will be more apparent from the ensuing description with reference to the accompanying drawing wherein:

FIG. 11 is a perspective view of a display apparatus for a vehicle according to a further embodiment of the present invention;

FIG. 12 is a plan view of a pointer of the display apparatus shown in FIG. 11;

DETAILED DESCRIPTION OF PREFERRED EMBODIMENTS

Figure 16:
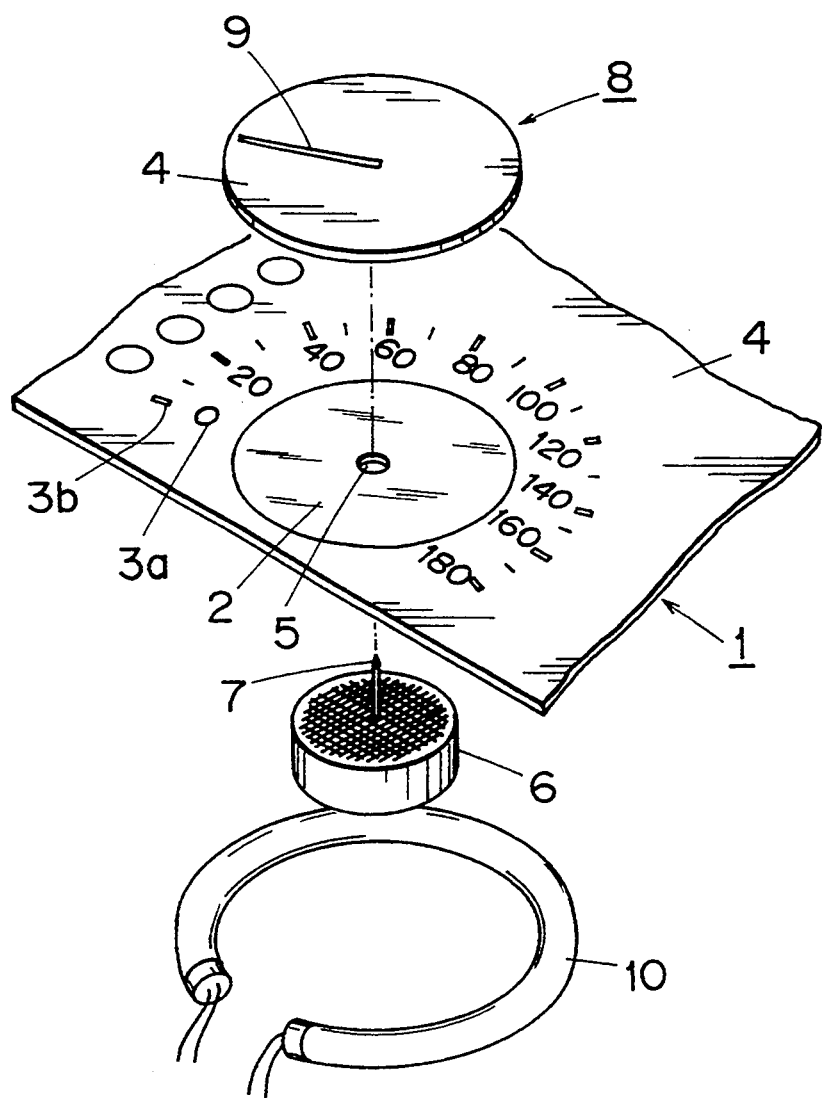
FIG. 16 is a perspective view of a conventional display apparatus for a vehicle.
Figure 17:
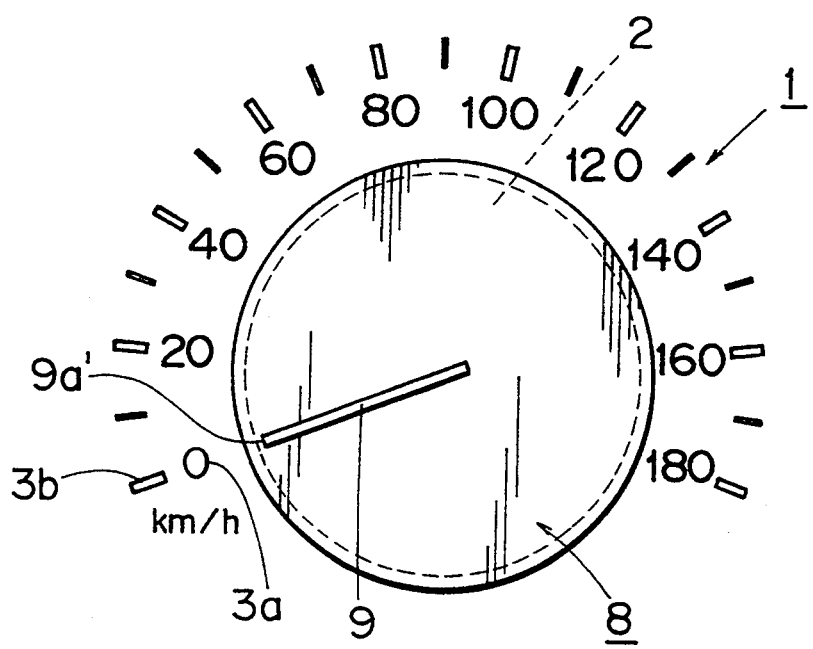
FIG. 17 is a plan view of the conventional display apparatus for a vehicle.
Figure 18:
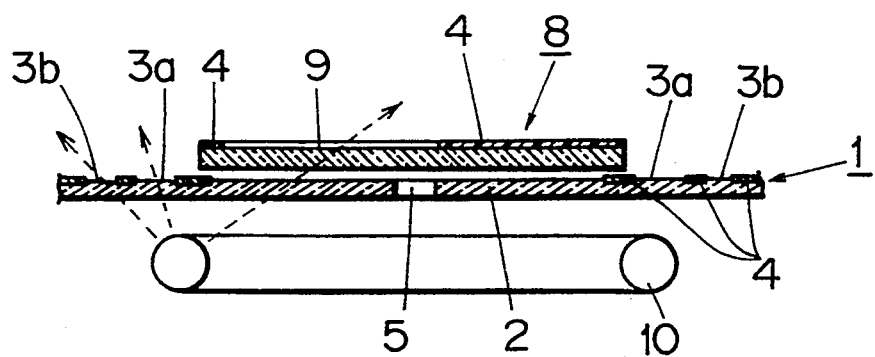
FIG. 18 is a cross-sectional front view of the conventional display apparatus for a vehicle illustrated in FIG. 17.
Figure 19:
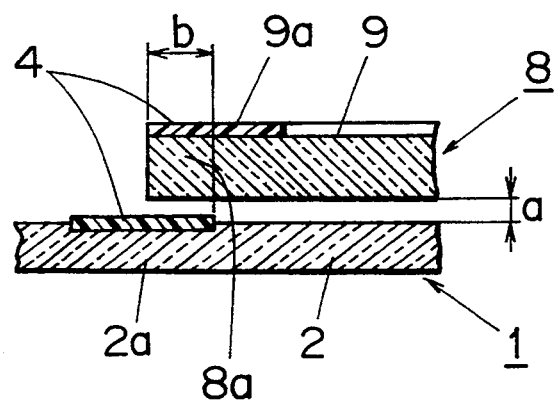
FIG. 19 is a cross-sectional view of a primary portion of the conventional display apparatus for a vehicle.

FIGS. 1 to 4 show a display apparatus for a vehicle according to an embodiment of the present invention. A substantially circular light-transmissible portion 2 is formed on a dial 1 made of a light-diffusing plate, which is disposed in an instrument case mounted to a dashboard of a vehicle not shown. Characters 3a and graduations 3b with light-transmissibility are arranged out of the light-transmissible portion 2. A light-intercepting layer 4 with black color or the like is formed on a portion of the dial 1 excluding areas corresponding to the light-transmissible portion 2, the characters 3a and the graduations 3b. Further, as in FIG. 16, a center hole 5 is drilled in the middle of the dial 1. On the rear side of the dial 1 is situated an instrument movement 6 which is driven according to a measured value, and a rotating shaft 7 of the movement 6 is inserted into the center hole 5.

A supporting member 11 is attached to a tip of the rotating shaft 7. A pointer member 12 is made of, for instance, transparent resin containing fluorescent pigment and has a shape of a cone. The diameter of a front end of the pointer member 12 is smaller than that of an end thereof. A tip 12a of the pointer member 12 extends beyond an outer periphery of the light-transmissible portion 2 of the dial 1. Further, both end faces of the pointer member 12 are formed flat, and silver coating is applied to the end faces by means of the hot stamping or evaporation to form reflection faces 13. Furthermore, a white layer 14 is formed on a rear face of the pointer member 12 by the hot stamping or the like.

Figure 2:
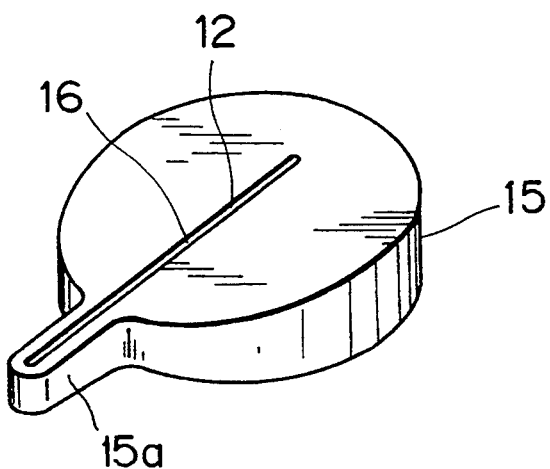
FIG. 2 is a perspective view of a pointer cover of the display apparatus illustrated in FIG. 1.
Figure 3:
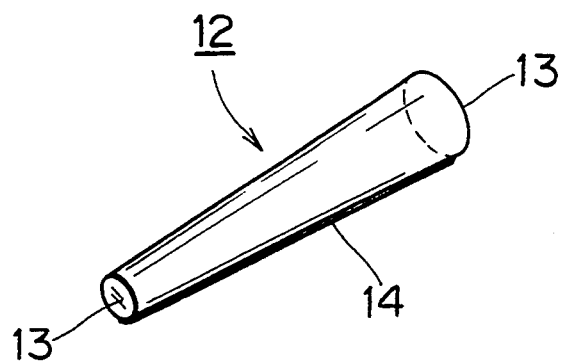
FIG. 3 is a perspective view of a pointer member of the display apparatus shown in FIG. 1.
Figure 4:
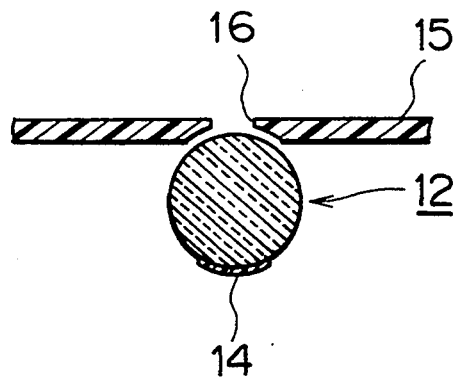
FIG. 4 is a cross-sectional side view of the pointer cover and the pointer member shown in FIGS. 2 and 3 respectively.

A pointer cover 15 made of a light-intercepting thin plate as a circular pointer plate covers the pointer member 12 and the light-transmissible portion 2 as illustrated in FIG. 2. The pointer cover 15 has an outer diameter slightly larger than that of the light-transmissible portion 2 of the dial 1 and a portion 15a of the cover 15 outwardly extends to cover the pointer member 12. A slit 16 is longitudinally formed on the pointer cover 15 so that an upper portion of the pointer member 12 is recognizable therethrough.

The working of the display apparatus according to the above embodiment will be explained.

In this embodiment, on switching on a light source not shown, which is disposed on the rear side of the dial 1, a light emitting by the light source reaches the rear face of the dial 1 to emit light from the areas corresponding to the characters 3a and the graduations 3b, and the light from the light source passes through the light-transmissible portion 2 to enter the pointer member 12 from a rear face thereof.

The pointer member 12 causes the light entering from the surface thereof to pass through an end face thereof with high luminance. However, in this embodiment, both end faces of the pointer member 12 is formed to have a reflecting function so that the light from the peripheral face does not go out of the end faces of the pointer member 12. As a result, the light is reflected on the end faces 13 and is confined in the pointer member 12. Then, the light is repeatedly reflected on the both faces and is finally reflected on the white layer 14 on the rear face of the pointer member 12, and goes out of an upper peripheral face of the pointer member 12 to pass through the slit 16 of the pointer cover 15.

Under the condition described above, the movement 6 is driven according to the measured value to rotate the pointer member 12 with the pointer cover 15 through the rotation shaft 7, causing the light emitted from the slit 16 of the pointer cover 15 to work as a luminous pointer. As a result, the luminous pointer indicates the characters 3a and the graduations 3b to display the measured value.

In this embodiment, the slit 16 of the pointer cover 15 is positioned in close vicinity to the pointer member 12 and the light entering the pointer member 12 from the peripheral face thereof goes out of the slit 16 of the pointer cover 15. Therefore, the pointer member 12 functions as a light introducing member to gather the light from the light source and to introduce it into the slit 16, which considerably increases the quantity of the light emitted from the slit 16.

Moreover, the pointer member 12 is provided with reflection surfaces 13 at both ends thereof so that the light entering the pointer member 12 from the peripheral faces does not go out of the end faces of the pointer member 12 and is repeatedly reflected on the inner wall of the pointer member 12 to be emitted from the upper side wall thereof, which makes it possible to efficiently introduce the light from the light source to the slit 16. As a result, the luminous pointer portion becomes luminous with high luminance, resulting in improved recognizability and readability of the display apparatus.

The tip 12a of the pointer member 12 extends beyond the light-transmissible portion 2 of the dial 1 and the pointer cover 15 with the slit 16 is situated over the pointer member 12. Further, even if the light from the light source does not enter the tip 12a of the pointer member 12, the light entering the pointer member 12 is reflected on the reflection faces 13 and is securely introduced to the tip 12a of the pointer member 12. Therefore, the luminous pointer portion has sufficient luminance from the base to the tip and sufficient length to indicate the characters 3a and the graduations 3b, which greatly improves the recognizability and readability of the apparatus. Moreover, overall shape of the apparatus is looked large and attractive, resulting in improved product value.

Figure 5:
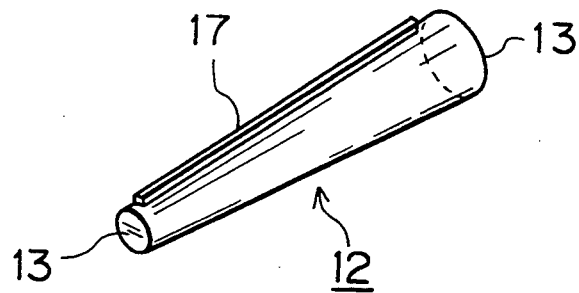
FIG. 5 is a perspective view of a pointer member of a display apparatus according to another embodiment of the present invention.
Figure 6:
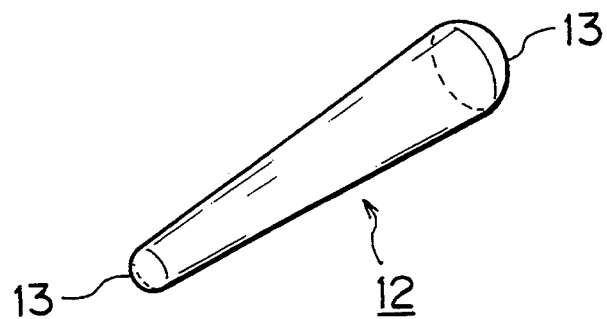
FIG. 6 is a perspective view of a pointer member according to a further embodiment of the present invention.
Figure 7:
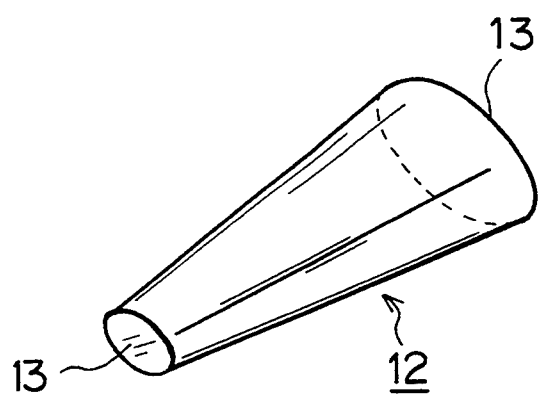
FIG. 7 is a perspective view of a pointer member according to a further embodiment of the present invention.

In the embodiment described above, the pointer member 12 is formed as a truncated cone. However, a projection 17 may be formed so as to be engaged with the slit 16 of the pointer cover 15 as illustrated in FIG. 5. The both end faces of the pointer member 12 may be spherically formed to provide reflection faces without the treatment such as hot stamping as illustrated in FIG. 6. Further, the cross section of the pointer member 12 may be formed as an ellipse.

In the above embodiment, the slit 16 is formed as a long hole. However, any slit may be applicable as long as the light-transmissibility is provided. On the other hand, the dial 1 is provided with the round light-transmissible portion 2, but, the portion 2 may be formed as a mere opening. Further, the pointer cover 15 as a round pointer plate may be made of resin or metal as long as a portion excluding the slit 16 has a light-intercepting function.

Figure 8:
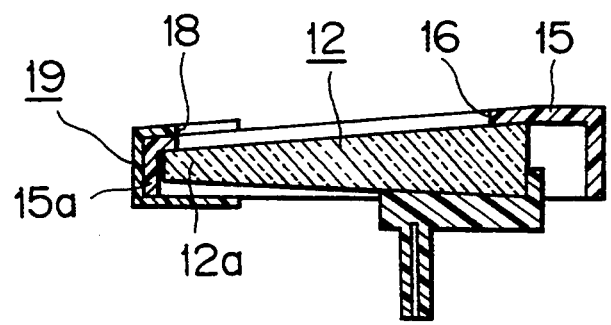
FIG. 8 is a cross-sectional view of a display apparatus for a vehicle according to another embodiment of the present invention.
Figure 9:
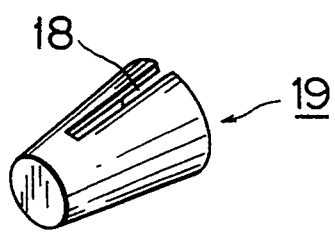
FIG. 9 is a perspective view of a cap of the display apparatus according to the present invention shown in FIG. 8.
Figure 10:
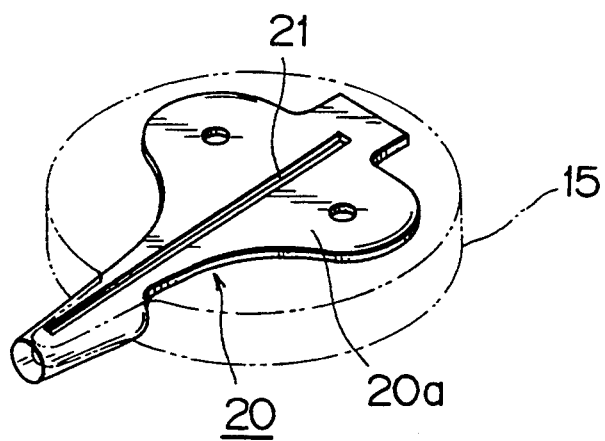
FIG. 10 is a perspective view of another cap according to the present invention.

FIGS. 8 to 10 show a display apparatus for a vehicle according to another embodiment of the present invention, in which the recognizability and the readability are further improved.

Figure 1:
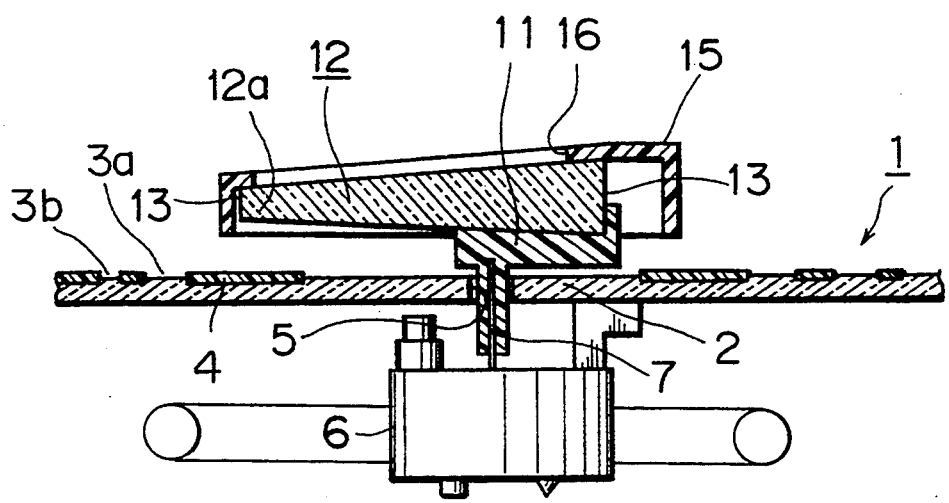
FIG. 1 is a cross-sectional view of a display apparatus for a vehicle according to an embodiment of the present invention.

In the embodiment shown in FIG. 1, the tip 12a of the pointer member 12 made of transparent synthetic resin is formed so as to extend up to the area of the characters 3a and the graduations 3b. Therefore, the light introduced to the tip 12a passes through the slit 16, but, a part of the light is leaked from the rear face of the tip 12a toward the dial 1, which causes halation that the surface of an area adjacent to the area of the characters 3a and graduations 3b of the dial 1 to be bright. When the halation occurs, the contrast between the characters 3a and the graduations 3b, which become luminous by backlighting, and a portion surrounding the graduations becomes small, which deteriorates the recognizability and readability of the characters and the like.

To eliminate the above drawbacks, in this embodiment of the present invention, a cap 19 with a shape of substantial cone is attached to the pointer cover 15 so as to cover the tip 12a of the pointer member 12 and a projecting portion 15a of the pointer cover which covers the tip 12a as illustrated in FIG. 8. The cap 19 is provided with a light-transmissible slit 18 extending from a base toward a tip thereof as illustrated in FIG. 9, and the slit 18 overlaps the slit 16 of the pointer cover. The cap 19 is made of resin or metal and a portion except for the slit 18 thereof is formed to have light-intercepting function. White paint or the like is applicable to an inner wall of the cap to improve reflectivity.

With the construction described above, the light leaked from the rear face of the tip 12a of the pointer member 12 toward the dial 1 is reflected on the inner face of the cap 19 so as to be introduced into the tip 12a of the pointer member 12 again and to be emitted from the slit 18 of the cap 19, which permit a tip of the luminous pointer portion where the light from the light source does not enter directly to effectively be luminous. Further, the leakage of the light toward the dial is prevented to eliminate the halation, resulting in improved recognizability and readability of the characters 3a.

In the embodiment described above, the explanation was made in case that the cap is mounted to cover the tip 12a of the pointer member 12 and the projecting portion 15a of the pointer cover 15. However, an upper face portion of a cap 20 may be formed so as to extend up to an upper face of the pointer cover 15 and a transparent slit 21 may be formed from a tip of the cap 20 to the extended portion 20a to further clarify an outline of the luminous pointer portion which is luminous by the back-lighting, improving the product value of the apparatus.

FIGS. 11 to 15 show a display apparatus according to further embodiment of the present invention. A circular cap-shaped pointer plate 23 with an outwardly extending pointer portion 22 is disposed on the front side of a dial 1 with a round light-transmissible portion 2. A light-transmissible slit 24 is formed on the pointer plate 23 from the middle to a tip thereof and an area excluding the slit is formed as a light-intercepting portion. Further, a light introducing plate 25 made of resilient resin containing fluorescent pigment or the like is disposed in the pointer plate 23.

Figure 13:
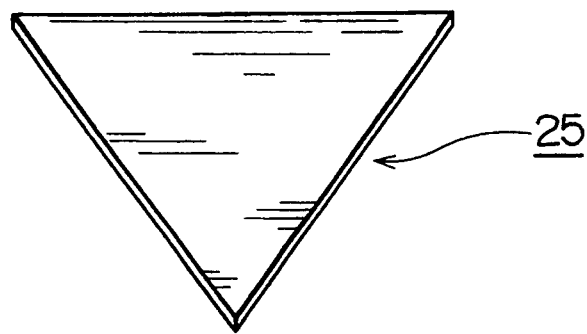
FIG. 13 is an exploded perspective view of the pointer shown in FIG. 11.
Figure 14:
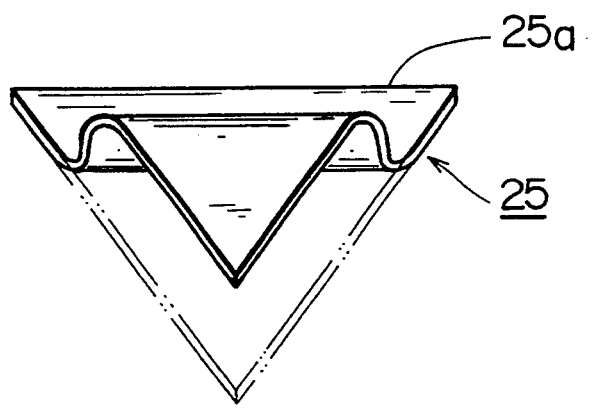
FIG. 14 is a perspective view of the folded light introducing plate illustrated in FIG. 11.
Figure 15:
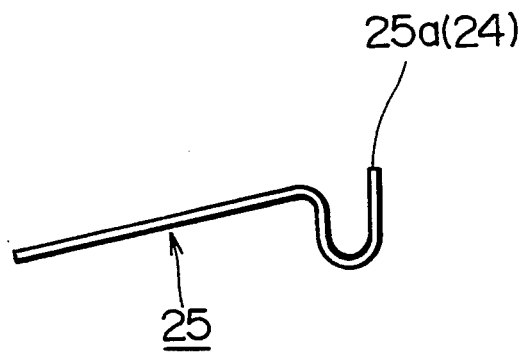
FIG. 15 is cross-sectional side view of the light introducing plate shown in FIG. 14.

The light introducing plate 25 is formed to be a plane with a shape of a substantial triangle as illustrated in FIGS. 13 to 15, which causes the light entering the surface of the light introducing plate 25 to be emitted from side faces thereof with high luminance. In this embodiment, a side face 25a of the light introducing plate 25 is disposed in the pointer plate 23 in such a manner as to be recognizable through the slit 24 from the front of the pointer plate 23. A portion of the light introducing plate 25 other than the side face 25a is folded to accommodate the plate 25 in the pointer plate 23.

In the display apparatus according to the above embodiment, the light entering the light introducing plate 25 passes therethrough and is introduced to the side face 25a to go out of the slit 24 of the pointer plate 23. As a result, the planar light introducing plate 25 is provided with an area to receive a large quantity of light so that the light passes through the slit 24 with high luminance. Further, the side face 25a of the light introducing plate 25 is located so as to be recognizable through the slit 24 of the pointer plate 23, and the light entering the light introducing plate 25 is emitted from the slit 24 with uniform and high luminance, which permits the luminous pointer portion to indicated the characters 3a and the graduations 3b with high luminance and with sufficient length of the pointer.

The tip of the pointer portion 22 of the pointer plate 23 is installed in cross vicinity of the areas of the characters 3a and graduations 3b, which considerably improves the recognizability and readability of the display apparatus. Further, the length of the luminous pointer of the pointer plate becomes long so that the display apparatus as a whole is looked large, which improves the product value of the apparatus.

In the above embodiment, the light introducing plate 25 is formed by bending a resilient resin to dispose it into the pointer plate 23. However, the light introducing plate may be formed to be bent in advance before fixing in the pointer plate 23. Further, a light-intercepting means may be formed on a portion of the light introducing plate 25 corresponding to the pointer portion 22 of the pointer plate 23 to prevent the halation as illustrated in FIG. 8.

What is claimed is:

1. A display apparatus for a vehicle comprising:
    a dial with a substantially round light-transmissible portion;
    a pointer plate situated on a front side of the dial and driven to rotate according to a measured value;
    a light-transmissible slit formed on the pointer plate;
    a light source situated on a rear side of the dial; and
    a light introducing member for gathering light from said light source to introduce said light into said slit;
    wherein an outwardly extending projection is formed on an outer periphery of said pointer and said slit of the pointer plate is prolonged up to said projection.

2. A display apparatus for a vehicle as claimed in 1 wherein a portion of said light introducing member excluding an area of said slit, and said light transmissible portion of said dial are formed to have a light-intercepting function.

3. A display apparatus for a vehicle as claimed in claim 1 wherein said light introducing member includes a pointer member with a shape of substantial truncated cone and both end faces thereof are formed to have a light reflecting function for reflecting light back and forth therebetween to form diffused light, and said pointer member is situated in the close vicinity to said slit.

4. A display apparatus for a vehicle as claimed in claim 3, wherein said light introducing member is provided with a white layer as a reflection face on a surface of said light introducing member opposing a face adjacent to said slit of the pointer plate.

5. A display apparatus for a vehicle as claimed in claim 3, wherein a projection is formed on a surface of said light introducing member and is engaged with said slit of the pointer portion.

6. A display apparatus for a vehicle as claimed in claim 1, wherein a substantially cone-shaped cap with a reflection face on an inner face thereof is attached to an outer periphery of the pointer plate, and a light-transmissible slit on the cap is overlapped with the slit of the pointer plate to form a single luminous pointer portion.

7. A display apparatus for a vehicle as claimed in claim 1, wherein said light introducing member includes a light introducing plate for receiving the light from the light source on a front face thereof and emitting the light from a side face thereof, and said side face where the light is emitted is situated in close vicinity to the slit of the pointer plate.

* * * * *